US008915428B1

(12) United States Patent
Post

(10) Patent No.: US 8,915,428 B1
(45) Date of Patent: Dec. 23, 2014

(54) WIRELESS-ENABLED CARD READER

(71) Applicant: Square, Inc., San Francisco, CA (US)

(72) Inventor: Daniel Jeffrey Post, San Mateo, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/046,768

(22) Filed: Oct. 4, 2013

(51) Int. Cl.
*G06K 5/00* (2006.01)

(52) U.S. Cl.
CPC ........................................ *G06K 5/00* (2013.01)
USPC ........................................... 235/382; 235/375

(58) Field of Classification Search
CPC . G06Q 20/305; G06Q 20/32; G06Q 20/3278; G06K 7/083; G06K 7/082; G06K 19/072; G06K 5/00; G06K 7/087; G06K 7/06; G06K 7/00
USPC .......... 235/380, 441, 449, 492, 375, 439, 440
See application file for complete search history.

(56) References Cited

U.S. PATENT DOCUMENTS

| | | | | |
|---|---|---|---|---|
| 7,810,729 | B2 | 10/2010 | Morley, Jr. | |
| 2009/0095812 | A1* | 4/2009 | Brown et al. | 235/380 |
| 2011/0198395 | A1 | 8/2011 | Chen | |
| 2012/0011071 | A1* | 1/2012 | Pennock et al. | 705/75 |
| 2012/0293001 | A1* | 11/2012 | Chan et al. | 307/66 |
| 2012/0305645 | A1* | 12/2012 | Morley, Jr. | 235/380 |
| 2013/0087614 | A1* | 4/2013 | Limtao et al. | 235/449 |
| 2013/0343575 | A1* | 12/2013 | Lu | 381/111 |
| 2014/0001263 | A1 | 1/2014 | Babu et al. | |
| 2014/0054373 | A1* | 2/2014 | Tsai | 235/380 |
| 2014/0131442 | A1* | 5/2014 | Morrow et al. | 235/440 |

* cited by examiner

*Primary Examiner* — Edwyn Labaze
(74) *Attorney, Agent, or Firm* — Novak Druce Connolly Bove + Quigg LLP

(57) ABSTRACT

Methods, systems, and apparatus, for pairing a card reader and a computing device, including: determining, by the computing device, that an output connector of the card reader is connected to the computing device through a physical connector of the computing device; in response to determining, by the computing device, that the output connector of the card reader is connected to the computing device through the physical connector located on the computing device, sending, from the computing device and through the physical connector, data for establishing a wireless communication link between the card reader and the computing device; and pairing, using the data sent from the computing device through the physical connector, the card reader with the computing device, wherein, upon pairing, subsequent communications between the card reader and the computing device are performed over the wireless communication link.

30 Claims, 3 Drawing Sheets

WIRELESS-ENABLED CARD READER

TECHNICAL FIELD

This disclosure relates to a mobile card reader.

BACKGROUND

Generally, a merchant uses a terminal to process a transaction. The terminal is connected, usually with wires, to a cash register and to an Internet connection. Some terminals process chip cards. For such terminals, a card is inserted into the terminal and the user enters a Personal Identification Number (PIN) on a keypad of the terminal. Other terminals process magnetic stripe cards. For such terminals, the card is swiped through a slot. Mobile card readers are available for magnetic stripe cards. Some mobile card readers, e.g., mobile card readers installed in taxies, use cellular technology to communicate wirelessly with the credit card processor.

Conventional point of sale electronic credit card transactions are authorized and captured. In the authorization stage, a physical credit card with a magnetic stripe is swiped through a merchant's magnetic card reader, e.g., as part of a point of sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, the card network, and the card issuer.

BRIEF DESCRIPTION OF THE DRAWINGS

Like reference numbers and designations in the various drawings indicate like elements.

DETAILED DESCRIPTION

Figure 1:
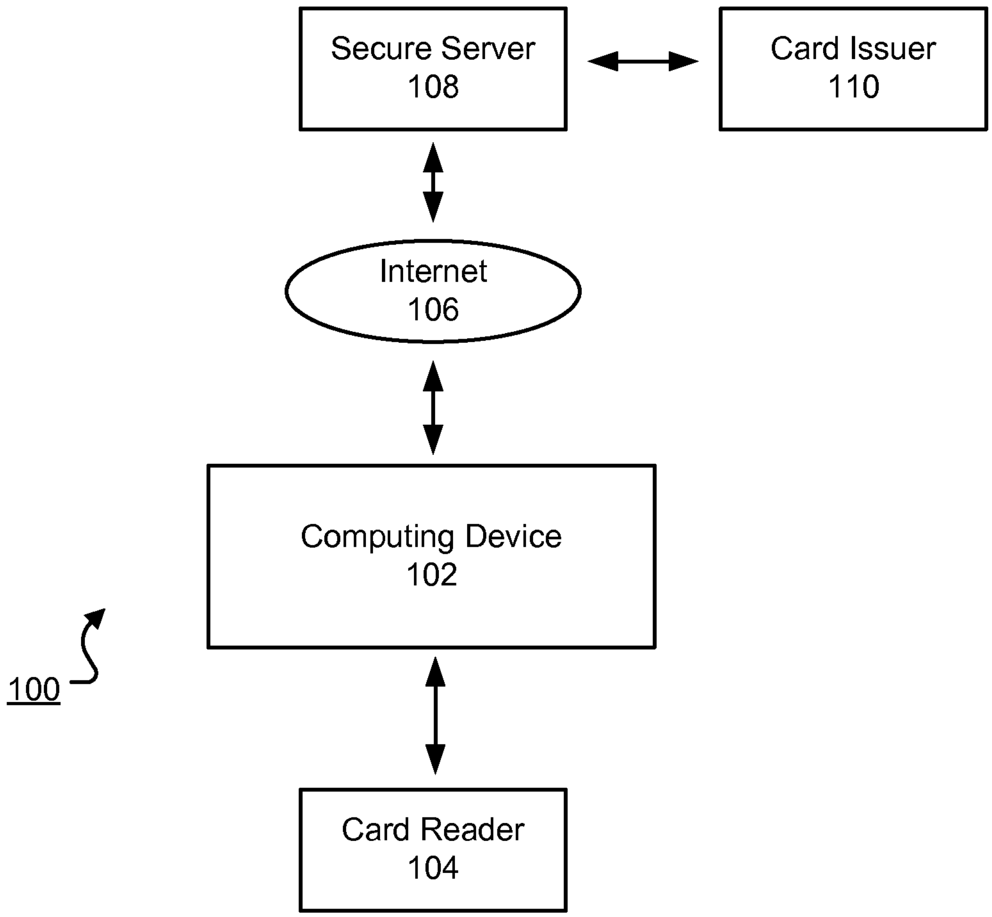
FIG. 1 is a schematic illustration of an example system for conducting a transaction using a card reader.

A card reader can be paired (e.g., configured to communicate wirelessly) with a computing device using various techniques that do not require user interaction.

In one example, a user can pair a card reader with a computing device by connecting an output connector of the card reader to a physical connector (e.g., a jack) located on the computing device. The card reader and the computing device can determine that the output connector of the card reader is connected to the jack located on the computing device. Once connected, the computing device sends, through the jack, data indicating whether the computing device supports wireless communication. Alternatively, upon connecting, the card reader can send an information data packet that requests, from the computing device, data describing whether the computing device supports wireless communication.

If the computing devices does not support wireless communication (e.g., using Bluetooth LE), the card reader and the computing device continue communicating with each other (e.g., communicating data describing financial cards swiped through the card reader), through the jack, until the output connector on the card reader is disconnected from the jack located on the computing device.

However, if the computing device supports wireless communication (e.g., using Bluetooth LE, Near Field Communication, Wi-Fi, Infrared, or other optical technologies), the card reader and the computing device exchange, through the jack, data for establishing a secure wireless communication link between the card reader and the computing device. This data can include one or more secret keys for encrypting data that is send over the wireless communication link. Additionally, the data includes a name of the card reader for use in identifying the card reader among other wireless devices, along with a passcode for authorizing the computing device to access the card reader. Once this data is exchanged, the card reader is automatically paired with computing device, without user interaction, using the exchanged data. That is, the computing device can identify and connect to the card reader using the name and passcode provided by the card reader. By providing the name and passcode through the jack, a user is not needed to select, using an interface, the card reader from a list of available wireless devices, and to enter the passcode for accessing the card reader on the interface.

Advantages may include one or more of the following. Users typically perform a number of operations when pairing wireless devices. For example, a user will typically activate a pairing mode on a first device. The user will then configure a second device to pair with the first device, e.g., by selecting the first device in a user interface presented on a display screen of the second device, and inputting a password that confirms the pairing of the first device. This typical pairing process can be cumbersome and time consuming. In contrast, this specification describes a computing device that can be paired automatically with a card reader by inserting an output jack of the card reader into an audio jack of the computing device. Data for pairing the card reader can be communicated from the card reader to the computing device through a jack (e.g., a physical link) on the computing device. By sending the data for pairing the card reader through the jack, the computing device can receive the data over a secure physical link and can use the data to pair the card reader with the computing device without user interaction. Data for encrypting wireless communications between the card reader and the computing device can be sent through the jack, thereby reducing the likelihood of a third-party capturing the data. Once pairing is complete, the computing device can provide an electric charge to the card reader through the jack.

FIG. 1 is a schematic illustration of an example system 100 for conducting a transaction using a card reader. A transaction can include reading cards such as payment cards (e.g., credit cards), driver's license cards, identification cards, etc. The system 100 is capable of processing a payment transaction between a mobile computing device 102 and a card reader 104. The computing device 102 can be a mobile device or a desktop device. Mobile devices include smart phones, tablet computers, laptops, or other mobile data processing apparatus.

The card reader 104 can process magnetic stripe cards or smart chip cards. Smart chip cards can be processed according to the Europay, Mastercard, Visa (EMV) protocol. The card reader 104 includes one or more read heads to capture card data, and a wireless transceiver to communicate wirelessly with the computing device 102. The card reader 104 need not include a keypad, a display, an interface for receiving signatures, e.g., a touch screen display, or a cellular connection to a payment processing system on an external network, e.g., the Internet. Thus, the card reader can be smaller, lighter and simpler than card readers with integrated keypads or displays.

The card reader 104 can send data to, and receive data from, the computing device 102. The card reader 104 includes an output connector, e.g., an audio output connector, through which the card reader 104 communicates with the computing device 102. The card reader 104 includes circuitry for communicating wirelessly, e.g., a Bluetooth Low Energy (Bluetooth LE or BLE) chip that is configured to communicate wireless using the BLE wireless protocol.

The card reader 104 can determine whether the computing device 102 supports wireless communication (e.g., using BLE) and, in response to determining that the computing device 102 supports wireless communication, the card reader 104 can communicate with the computing device 102 wirelessly (e.g., using the BLE chip) instead of the output connector. When communicating wirelessly, the card reader 104 and the computing device 102 undergo a pairing process, prior to communicating data, as described below.

When performing a payment transaction using a magnetic stripe card, the card can be swiped through the card reader 104. Assuming the computing device 102 supports wireless communication, upon completing the swipe, the card reader 104 captures and sends card data of the magnetic stripe card to the computing device 102 wirelessly, for example, using the BLE chip, Near Field Communication, Wi-Fi, Infrared, or other optical technologies. On the other hand, if the computing device 102 does not support wireless communication (e.g., BLE), the card data is sent through the physical connection, e.g., the audio jack. The remainder of the transaction can occur between the computing device 102 and other card processing systems.

When performing a payment transaction using a smart chip card, the card can be inserted into the card reader 104 so that the reader 104 engages electrical contacts for a microchip on the card. Assuming the computing device 102 supports wireless communication, upon inserting the card, the card reader 104 captures and sends a personal identification number ("PIN") request to the computing device 102 wirelessly, for example, using the BLE chip. The computing device 102 receives a PIN from the user, e.g., entered through a user interface on, or connected to, the computing device, and sends the PIN to the card reader 104 wirelessly, for confirmation. The card reader 104 sends the PIN to the card, which contains a chip with an embedded PIN. The card compares the received PIN to the embedded PIN. If the PINs match, the card sends a confirmation to the card reader 104. The card reader 104 wirelessly sends the confirmation to the computing device 102, for example, using the BLE chip.

After receiving data, e.g., card data or a confirmation, from either the magnetic stripe card or the smart chip card, the computing device 102 can transmit an authorization for transaction to a secure server 108 for payment processing using, for example, an external network, e.g., the Internet 106. The secure server 108 can relay the transaction to the card issuer 104, which ultimately approves or denies the transaction. The card issuer 104 can communicate the approval or denial to the secure server 108, which can communicate the card issuer's approval or denial to the computing device 102.

Figure 2:
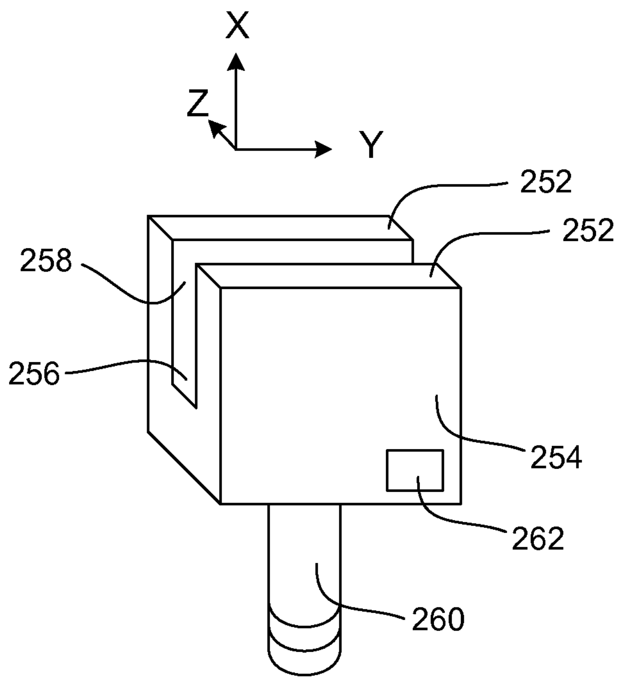
FIG. 2 is a schematic perspective view of a wireless card reader.

FIG. 2 is a schematic perspective view of a wireless card reader 104. The card reader 104 includes a body 254 that encapsulates a magnetic read head. The body 254 of the card reader 104 also includes a slot 256. The slot 256 can be defined by a space between parallel first and second side wall 252 and closed off at the bottom by a bottom surface 256 extending between the side walls 252. The slot 256 can be open on near and far ends of the side walls 252. A magnetic stripe card can be swiped through the slot 256 in the body 254. The magnetic read head can be positioned on the interior surface 258 of one of the side walls 252.

The card reader 104 includes an output connector 260. In some implementations, the output connector 260 is an audio output connector. Other implementations are possible. For example, the output connector 260 can be a Universal Serial Bus (USB) interface, a 30-pin connector interface, or a Lightning connector interface. The card reader 104 can use the output connector 266 to communicate (e.g., by transmitting digital signals that represent card data) with the computing device 102.

The card reader 104 also includes a chip 262 that is configured to wirelessly communicate with the computing device 102. Depending on the implementation, the chip 262 can be configured to wirelessly communicate with the computing device 102 using, for example, Near Field Communication, Wi-Fi, Infrared, or other optical technologies.

In some implementations, the chip 262 is a BLE chip. Typically, two or more BLE-enabled devices communicate with each other over a wireless communication link. Generally, when forming a wireless communication link between BLE-enabled devices, a first BLE-enabled device can detect advertising data packets that are being broadcast from a second BLE-enabled device. Based on the advertising data packets, the first BLE-enabled device can indicate to a user operating the first BLE-enabled device that the second BLE-enabled device is available for connection. The user operating the first BLE-enabled device can instruct the first BLE-enabled device to send a connection request to the second BLE-enabled device.

Once the second BLE-enabled device accepts the connection request, the first BLE-enabled device (e.g., master device) sends to the second BLE-enabled device (e.g., slave device) data for establishing a wireless communication link. For example, the data can specify a connection interval and a latency interval. Generally, the connection interval determines the time between the start of a data packet exchange sequence between the first and second BLE-enabled devices over the wireless communication link. Latency is a number of communication intervals that a slave device may ignore without disconnecting from the wireless communication link. In some implementations, the card reader 104 is configured to establish a BLE wireless communication link with the computing device 102 by exchanging data through the output connector 260, as described below in reference to FIG. 3.

Figure 3:
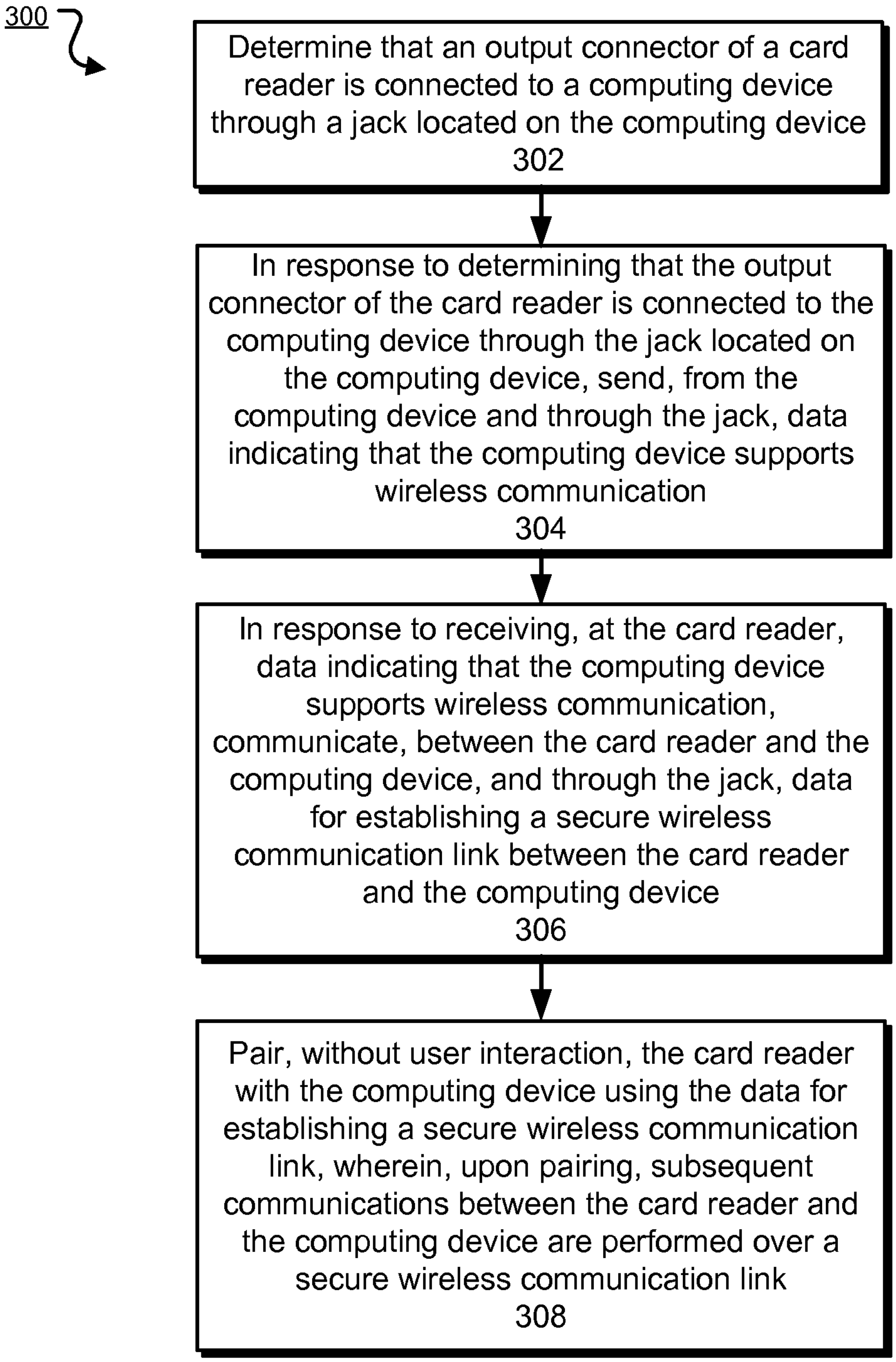
FIG. 3 is a diagram of an example flow chart for pairing a card reader.

FIG. 3 is a diagram of an example flow chart 300 for communicating data from a card reader to a computing device. For convenience, the process 300 will be described as performed using a computing device, e.g., the computing device 102, and a card reader, e.g., the card reader 104.

The computing device determines that an output connector of a card reader is connected to the computing device through a jack located on the computing device (302). In some implementations, the jack located on the computing device is an audio jack and the output connector of the card reader is an audio output connector. The computing device and the card reader can determine when the output connector of the card reader is inserted into the jack located on the computing device. In some implementations, the computing device and the card reader determine that the output connector of the card reader is inserted into the jack located on the computing device by detecting a sensor trip (e.g., triggering of a switch in the jack) that results upon insertion of the output connector of the card reader into the jack located on the computing device. Software (e.g., a card reader application) running on the computing device can detect the sensor trip that resulted upon insertion of the output connector of the card reader into the jack located on the computing device. In response to detecting the sensor trip, the computing device can send a data packet to the card reader, through the jack, that requests data identifying the card reader. Upon receiving the data packet, the card reader can send, through the jack, information describing the card reader including, a card reader model number. The computing device can determine, using the information that was sent from the card reader, that a card reader is inserted into the jack. In some implementations, the computing device and the card reader determine that the output connector of the card reader is inserted into the jack located on the computing device by detecting, on the computing device, a "chirp" sent, from the card reader to the computing device, upon insertion of the output connector of the card reader into the jack located on the computing device. The chirp sent from the card reader can be sent in response broadcast chirps being sent from the computing device through the jack. For example, a card reader application running on the computing device can send, through the jack, broadcast chirps at timed intervals to determine whether a card reader is connected through the audio jack. The card reader application can monitor the audio jack for chirps sent by a card reader in response to the broadcast chirps. Chirps sent by the card reader can include information that identifies the card reader (e.g., using a card reader model number). Once a card reader is detected, the card reader application is configured to communicate with the card reader and to perform various operations related to the card reader (e.g., processing card data).

Other ways of determining the connection are possible. For example, the computing device can implement jack sensing operations that measure the impedance and other characteristics of the plugged in device to determine the presence of a card reader. As used in this specification, a "chirp" refers to a data packet or message.

In response to determining, by the computing device, that the output connector of the card reader is connected to the computing device through the jack located on the computing device, the computing device sends, through the jack, data indicating that the computing device supports wireless communication (304). For example, in response to determining that the card reader is connected to the computing device through the jack, a card reader application on the computing device can send, through the jack, data indicating whether the computing device supports wireless communication. In some implementations, the data indicates whether the computing device supports wireless communication using the BLE protocol. The data can indicate whether the computing device supports other types of wireless communication, e.g., Bluetooth, ultra-wideband (UWB), ZigBee, and Wi-Fi.

In response to receiving, at the card reader, data indicating that the computing device supports wireless communication, the card reader and the computing device communicate, through the jack, data for establishing a secure wireless communication link between the card reader and the computing device (306). For example, the computing device can communicate, through the jack, data that specifies a connection interval and a latency interval for establishing a BLE wireless communication link. In some implementations, the card reader and the computing device exchange secret keys (e.g., symmetric encryption keys, block ciphers, stream ciphers, etc.) for use in encrypting data that is communicated between the card reader and the computing device. The secret keys can be used to encrypt data that is communicated between the card reader and the computing device over a wireless communication link. Sending the secret keys through the jack allows the card reader and the computing device to securely exchange the secret keys, thereby reducing the likelihood of the secret keys being captured by a third-party (e.g., through a man-in-the-middle attack). Depending on the implementation, the card reader and the computing device can exchange one or more secret keys, one or more public keys, a shared secret key, or perform a Diffie-Hellman key exchange.

In some implementations, the card reader sends, through the jack, information for establishing a wireless communication link with the card reader. The information sent can include a name of the card reader that allows the computing device to identify the card reader. The information sent can also include a passcode for authorizing the computing device to the card reader. The computing device can use the information provided by the card reader to establish a wireless communication link with the card reader without requiring user input, as described below.

The computing device pairs the card reader, without user interaction, using the data for establishing a secure wireless communication link between the card reader and the computing device (308). In some implementations, to pair the card reader and the computing device, without user interaction, the card reader automatically activates, after exchanging the data for establishing a secure wireless communication link with the computing device, a discovery mode that enables discovery of the card reader using a wireless protocol. Further, the computing device uses the data for establishing a secure wireless communication link to complete the pairing process. For example, the computing device can identify the card reader from other available wireless devices using the name that was provided by the card reader. The computing device can subsequently connect to the card reader using the passcode that was also provided by the card reader. Thus, a user is not needed to complete the pairing.

Once pairing is complete, a wireless communication link is established between the computing device and the card reader. In some implementations, the wireless communication link uses a Bluetooth LE protocol. Other implementations are possible. For example, the wireless communication link can use a standard Bluetooth protocol, ultra-wide band, ZigBee, and Wi-Fi. After pairing, the computing device and the card reader communicate with each other using the wireless communication link and no longer send data through the jack. Further, both the card reader and the computing device encrypt data being sent over the wireless communication link using the previously exchanged secret keys. As a result, data sent over the wireless communication link is encrypted and secure from third-party access.

After pairing, since the data is sent over the wireless communication link, and not through the jack, in some implementations the output connector of the card reader can be disconnected from the computing device. In such implementations, the card reader and the computing device can continue to communicate with each other over the wireless communication link despite not being physically connected through the jack. For example, when a financial card (e.g., credit card) is swiped through the card reader, the card reader can transmit data describing the financial card securely over the wireless communication link, and not through the jack. Using the wireless communication link to communicate data provides several advantages that are generally not available when sending data through the jack. For example, the wireless communication link is typically capable of increased bandwidth, lower latency, and can also result in lower power consumption. Once the card reader and the computing device are paired, the output jack of the card reader can be removed from the jack on the computing device without affecting the wireless communication link between the card reader and the computing device. Similarly, the output jack of the card reader can stay plugged into the jack on the computing device without affecting the wireless communication link between the card reader and the computing device. In some implementations, once the card reader and the computing device are paired, a display screen on the computing device displays a message indicating that the card reader and the computing device are paired, and that the output jack of the card reader can safely be removed from the jack on the computing device.

In some implementations, the card reader includes a keypad that allows users to enter their PIN numbers for authorizing their respective smart chip cards. In such implementations, once the card reader and the computing device are paired, the card reader can be disconnected from the jack located on the computing device, with the cardholder's card still inserted in the card reader, and given to the cardholder for inputting their PIN. The cardholder can interact with the keypad on the card reader to enter their PIN to authorize the transaction.

Using the wireless communication link to communicate data can also free up the jack (e.g., audio jack) for use in delivering an electric charge from the computing device to the card reader. For example, sending data between the card reader and the computing device using an audio jack generally requires use of a left and a right audio signal of the audio jack. Once the wireless communication link is active, the left and right audio signals of the audio jack are no longer needed for communicating data. Thus, in some implementations, the computing device can be configured to send an electric charge to the card reader through the left and right audio signals of the audio jack. As a result, the computing device can deliver additional power to the card reader.

In some implementations, data may be sent between the card reader and the computing device using a left and a right MIC, or microphone, channel of the audio jack. Once the wireless communication link is active, the left and right MIC audio channels of the audio jack are no longer needed for communicating data. Thus, in some implementations, the computing device can be configured to send an electric charge to the card reader through the left and right MIC channels of the audio jack. As a result, the computing device can deliver additional power to the card reader.

While this specification describes communication between a card reader that includes an output connector and circuitry for communicating wirelessly and a computing device, the technologies described herein are application to other devices that also include an output connector and circuitry for communicating wirelessly.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of the card reader may not be limited to financial transactions but could also be applied to other environments, such as processing driver's licenses.

What is claimed is:

1. A system comprising:

a card reader, including an output connector, a read head, a chip card reader, and circuitry for wirelessly communicating data, the card reader configured to:
- capture card information from a swipe of a magnetic stripe card through the read head or from contacts of a chip card that is inserted into the chip card reader;
- send data through the output connector for establishing a secure wireless communication link; and
- send the captured card information over the secure wireless communication link; and a computing device, including a physical connector configured to engage the output connector and circuitry for wirelessly communicating data with the card reader, the computing device configured to:
- determine that the output connector of the card reader is connected to the computing device through the physical connector of the computing device;
- send, through the physical connector, data indicating that the computing device supports wireless communication;
- send, through the physical connector, data for establishing the secure wireless communication link between the computing device and the card reader; and
- pair the card reader with the computing device using data for establishing the secure wireless communication link, wherein upon pairing, subsequent communications between the card reader and the computing device are performed over the secure wireless communication link and not through the physical connector.

2. The system of claim 1, wherein the card reader is further configured to activate a discovery mode that enables discovery of the card reader using a wireless protocol, and wherein the computing device is further configured to pair the card reader to the computing device using the data for establishing the secure wireless communication link between the card reader and the computing device, the data including identity information associated with the card reader and a passcode for authorizing the computing device to the card reader.

3. The system of claim 1, wherein the physical connector is an audio jack, wherein the output connector is an audio output connector, and wherein the computing device is further configured to send, from the computing device to the card reader, an electric charge through the audio jack, the electric charge being provided through one or more of a left audio signal of the audio jack and a right audio signal of the audio jack.

4. The system of claim 1, wherein the physical connector is an audio jack, wherein the output connector is an audio output connector, and wherein the computing device is further configured to send, from the computing device to the card reader, an electric charge through the audio jack, the electric charge being provided through one or more of a left MIC channel of the audio jack and a right MIC channel of the audio jack.

5. The system of claim 1, where the circuitry for wirelessly communicating data in the card reader and the circuitry for wirelessly communicating data in the computing device both comprise a Bluetooth LE protocol, Near Field Communication, Wi-Fi, Infrared, or wireless optical communication technology.

6. A method for communicating between a card reader and a computing device, comprising:

determining, by the computing device, that an output connector of the card reader is connected to the computing device through a physical connector of the computing device;

in response to determining that the output connector is connected, sending, from the computing device and through the physical connector, data for establishing a wireless communication link between the card reader and the computing device; and pairing, using the data, the card reader with the computing device, wherein, upon pairing, subsequent communications between the card reader and the computing device are performed over the wireless communication link and not through the physical connector.

7. The method of claim 6, wherein determining that an output connector of a card reader is connected further comprises:

detecting, on the card reader and on the computing device, a sensor trip that results upon insertion of the output connector of the card reader into the physical connector located on the computing device; or detecting, on the computing device, a signal sent, from the card reader to the computing device, upon insertion of the output connector of the card reader into the physical connector located on the computing device.

8. The method of claim 6, wherein in response to determining that the output connector is connected sending, from the computing device and through the physical connector, data for establishing the wireless communication link between the card reader and the computing device further comprises:

sending, from the computing device and through the physical connector, data associated with initiating wireless communication between the card reader and the computing device; and in response to receiving, at the card reader, data indicating that the computing device supports wireless communication, communicating, between the card reader and the computing device, and through the physical connector, data for establishing a wireless communication link between the card reader and the computing device.

9. The method of claim 8, wherein communicating, between the card reader and the computing device, and through the physical connector, data for establishing the wireless communication link further comprises:

communicating, between the card reader and the computing device, data for encrypting wireless communications between the card reader and the computing device; and sending, from the card reader and through the physical connector, information for establishing a wireless communication with the card reader, wherein the information comprises at least identity information associated with the card reader or a passcode for authorizing the computing device to the card reader.

10. The method of claim 6, wherein pairing, using the data the card reader with the computing device further comprises:

activating, on the card reader, a discovery mode that enables discovery of the card reader using a wireless protocol; and pairing, using the data sent from the computing device through the physical connector, the card reader to the computing device using the data for establishing the wireless communication link between the card reader and the computing device, the data associated with a name of the card reader and a passcode for authorizing the computing device to the card reader.

11. The method of claim 6, further comprising:

receiving, at the card reader, data describing a financial card that is inserted into the card reader; and transmitting, from the card reader to the computing device, and over the wireless communication link, the data describing the financial card.

12. The method of claim 6, wherein the card reader and the computing device are both Bluetooth LE enabled devices and wherein sending, from the computing device and through the physical connector, data for establishing a wireless communication link between the card reader and the computing device comprises:

sending, from the computing device and through the physical connector, data for establishing a Bluetooth LE wireless communication link, the data including data for encrypting communications between the card reader and the computing device over the Bluetooth LE wireless communication link; and wherein, upon establishing the Bluetooth LE wireless communication link, the computing device and the card reader communicate over the Bluetooth LE wireless communication link and not through the physical connector.

13. The method of claim 6, wherein the physical connector is an audio jack, and wherein the output connector is an audio output connector, further comprising:

sending, from the computing device to the card reader, an electric charge through the audio jack, the electric charge being provided through one or more of a left audio signal of the audio jack and a right audio signal of the audio jack.

14. The method of claim 6, wherein the physical connector is an audio jack, and wherein the output connector is an audio output connector, further comprising:

sending, from the computing device to the card reader, an electric charge through the audio jack, the electric charge being provided through one or more of a left MIC channel of the audio jack and a right MIC channel of the audio jack.

15. A non-transitory computer-readable medium storing software comprising instructions executable by a computing device which, upon such execution, cause the computing device to perform operations comprising:

determining, by a computing device, that an output connector of a card reader is connected to the computing device through a physical connector located on the computing device;

in response to determining that the output connector is connected sending, from the computing device and through the physical connector, data for establishing a wireless communication link between the card reader and the computing device; and pairing, using the data, the card reader with the computing device, wherein, upon pairing, subsequent communications between the card reader and the computing device are performed over the wireless communication link and not through the physical connector.

16. The medium of claim 15, wherein determining that an output connector of a card reader is connected further comprises:

detecting, on the card reader and on the computing device, a sensor trip that results upon insertion of the output connector of the card reader into the physical connector located on the computing device; or detecting, on the computing device, a signal sent, from the card reader to the computing device, upon insertion of the output connector of the card reader into the physical connector located on the computing device.

17. The medium of claim 15, wherein in response to determining that the output connector is connected to sending, from the computing device and through the physical connector, data for establishing the wireless communication link between the card reader and the computing device further comprises:

sending, from the computing device and through the physical connector, data associated with initiating wireless communication between the card reader and the computing device; and in response to receiving, at the card reader, data indicating that the computing device supports wireless communication, communicating, between the card reader and the computing device, and through the physical connector, data for establishing a wireless communication link between the card reader and the computing device.

18. The medium of claim 17, wherein communicating, between the card reader and the computing device further comprises:

communicating, between the card reader and the computing device, data for encrypting wireless communications between the card reader and the computing device; and sending, from the card reader and through the physical connector, information for establishing a wireless communication with the card reader, wherein the information comprises at least identity information associated with the card reader or a passcode for authorizing the computing device to the card reader.

19. The medium of claim 15, wherein pairing, using the data sent from the computing device through the physical connector further comprises:

activating, on the card reader, a discovery mode that enables discovery of the card reader using a wireless protocol; and pairing, using the data sent from the computing device through the physical connector, the card reader to the computing device using the data for establishing the wireless communication link between the card reader and the computing device, the data associated with a name of the card reader and a passcode for authorizing the computing device to the card reader.

20. The medium of claim 15, the operations further comprising:

receiving, at the card reader, data describing a financial card that is inserted into the card reader; and transmitting, from the card reader to the computing device, and over the wireless communication link, the data describing the financial card.

21. The medium of claim 15, wherein the card reader and the computing device are both Bluetooth LE enabled devices and wherein sending, from the computing device and through the physical connector, data for establishing the wireless communication link further comprises:

sending, from the computing device and through the physical connector, data for establishing a Bluetooth LE wireless communication link, the data including data for encrypting communications between the card reader and the computing device over the Bluetooth LE wireless communication link; and wherein, upon establishing the Bluetooth LE wireless communication link, the computing device and the card reader communicate over the Bluetooth LE wireless communication link and not through the physical connector.

22. The medium of claim 15, wherein the physical connector is an audio jack, and wherein the output connector is an audio output connector, further comprising:

sending, from the computing device to the card reader, an electric charge through the audio jack, the electric charge being provided through one or more of a left audio signal of the audio jack and a right audio signal of the audio jack.

23. The medium of claim 15, wherein the physical connector is an audio jack, and wherein the output connector is an audio output connector, further comprising:

sending, from the computing device to the card reader, an electric charge through the audio jack, the electric charge being provided through one or more of a left MIC channel of the audio jack and a right MIC channel of the audio jack.

24. A method for communicating between a card reader and a computing device, comprising:

receiving, at the card reader, from the computing device and through a physical connector that connects an output connector of the card reader to the computing device, data indicating that the computing device supports wireless communication;

sending, from the card reader and through the physical connector, information for establishing a wireless communication link with the card reader;

receiving, from the computing device and through the physical connector, information for establishing the wireless communication link with the computing device; and pairing with the computing device, wherein, upon pairing, subsequent communications between the card reader and the computing device are performed over the wireless communication link and not through the physical connector.

25. The method of claim 24, wherein the information for establishing the wireless communication link with the card reader comprises at least a name of the card reader and a passcode for authorizing the computing device to the card reader.

26. The method of claim 24, wherein pairing with the computing device further comprises:

activating, on the card reader, a discovery mode that enables discovery of the card reader using a wireless protocol;

receiving, from the computing device and through the wireless communication link, a passcode for authorizing the computing device to the card reader; and in response to authenticating the passcode for authorizing the computing device to the card reader, pairing with the computing device.

27. The method of claim 24, further comprising:

receiving, at the card reader, data describing a financial card that is inserted into the card reader; and transmitting, to the computing device and over the wireless communication link, the data describing the financial card.

28. The method of claim 24, wherein the wireless communication link uses a Bluetooth LE protocol.

29. The method of claim 24, wherein the physical connector is an audio jack, and wherein the output connector is an audio output connector, further comprising:

receiving, from the computing device and through the audio jack, an electric charge, the electric charge being provided through one or more of a left audio signal of the audio jack and a right audio signal of the audio jack.

30. The method of claim 24, wherein the physical connector is an audio jack, and wherein the output connector is an audio output connector, further comprising:

receiving, from the computing device and through the audio jack, an electric charge, the electric charge being provided through one or more of a left MIC channel of the audio jack and a right MIC channel of the audio jack.

* * * * *